US008851649B2

(12) United States Patent
Engel et al.

(10) Patent No.: US 8,851,649 B2
(45) Date of Patent: Oct. 7, 2014

(54) UV INK JET PRINTING INK COMPOSITION

(75) Inventors: Stefan Engel, Rückersdorf (DE); Dieter Prölβ, Schwabach (DE); Jörg Männig, Painesville, OH (US)

(73) Assignee: Eckart GmbH (DE)

( * ) Notice: Subject to any disclaimer, the term of this patent is extended or adjusted under 35 U.S.C. 154(b) by 525 days.

(21) Appl. No.: 13/107,036

(22) Filed: May 13, 2011

(65) Prior Publication Data

US 2012/0287213 A1 Nov. 15, 2012

(51) Int. Cl.

*B41J 2/01* (2006.01)
*C09D 11/101* (2014.01)
*B41J 2/21* (2006.01)
*C09D 11/322* (2014.01)

(52) U.S. Cl.

CPC ............. *C09D 11/101* (2013.01); *B41J 2/2107* (2013.01); *C09D 11/322* (2013.01)
USPC .............................. 347/100; 347/102; 347/95

(58) Field of Classification Search

CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ......... 347/100, 95, 96, 101, 102, 88, 99, 103; 106/31.6, 31.27, 31.13; 523/160, 161
See application file for complete search history.

(56) References Cited

U.S. PATENT DOCUMENTS 4,916,176 A * 4/1990 Vachlas et al. ................ 524/140
6,114,406 A * 9/2000 Caiger et al. ................ 106/31.6
6,550,905 B1 * 4/2003 Deckers ........................ 347/100
6,586,492 B1 * 7/2003 Caiger et al. .................... 522/75
2007/0249750 A1 10/2007 Oyanagi et al.
2010/0036036 A1 2/2010 Oyanagi
2010/0086701 A1 4/2010 Iftime et al.
2010/0279083 A1 11/2010 Trummer et al.

FOREIGN PATENT DOCUMENTS

EP 1 914 279 A2 4/2008
EP 1 918 857 A2 5/2008
EP 2 017 310 A1 1/2009
EP 2017310 A1 * 1/2009 ............ C09D 11/02
WO WO 2009/083176 A1 7/2009
WO WO 2011/000491 A2 1/2011

* cited by examiner

*Primary Examiner* — Manish S Shah
(74) *Attorney, Agent, or Firm* — Ostrolenk Faber LLP

(57) ABSTRACT

A 1K UV-ink jet printing ink composition comprising effect pigments, wherein the composition comprises:
a) at least one difunctional (meth)acrylate monomer,
b) at least one photoinitiator,
c) effect pigments having a volume averaged particle size distribution with a $D_{98}$<10 μm,
d) optionally trifunctional and/or polyfunctional (meth)acrylate monomers, and wherein the viscosity of the ink jet printing ink composition is at maximum 30 mPas, measured at 25° C. for 10 minutes with a Brookfield R/S rheometer using a double gap cylinder according to DIN 53453 (German Industrial Standards) at 150 rpm and wherein the total concentration of the at least one difunctional (meth)acrylate monomer of a) and the trifunctional and/or polyfunctional (meth)acrylate monomers of d) is in a range of 75 to 100 wt.-%, based on the total amount of (meth)acrylate monomers.

31 Claims, No Drawings

UV INK JET PRINTING INK COMPOSITION

TECHNICAL FIELD

The present invention is directed to a UV ink jet printing ink composition comprising effect pigments.

BACKGROUND

Conventional ink jet printing ink compositions contain large amounts of solvents leading to the disadvantage that the substrate to be coated must be resistant to the used solvent. Moreover, conventional coatings are usually dried by applying heat in order to remove the solvent and to cross-link the binding agents of the ink jet printing ink composition. If the substrate is heat-sensitive, the drying has to be performed at a low temperature for a longer period of time.

In view of that, UV ink jet printing ink compositions are advantageous in that these compositions do not contain solvents or only minor amounts of solvents and are dried or cured by irradiation of UV light.

Particular UV ink jet printing ink compositions are photo curable ink compositions for ink jet recording. For these photo curable ink compositions, it is necessary that the ink printed on the surface of a substrate, such as a sheet of paper or a foil, is quickly cured so that the printing process can be performed at a high velocity.

US 2010/0036036 A1 discloses a photo curable ink composition for ink jet recording comprising a metallic pigment, a polymerizable compound, and a polymerization initiator, wherein the metallic pigment is a plate-like particle composed of a laminate, including a metal or alloy layer, and at least one selected from a resin layer and a silicon oxide layer.

The polymerizable compound includes monofunctional polymerizable compounds and polyfunctional polymerizable compounds. According to the teaching of US 2010/0036036 A1, these polymerizable compounds are not particularly limited as long as polymerization is initiated by being supplied with any kind of energy to cure, and every form of a monomer or an oligomer, a linear polymer and a dendritic polymer can be used.

US 2007/0249750 A1 discloses a two-component photo curable ink composition set comprising an ink composition A containing at least a photoradical polymerization initiator and a radically polymerizable compound and not containing a colorant; and an ink composition B containing at least a colorant and a radically polymerizable compound and not containing a photo radical polymerization initiator.

EP 1 914 279 A2 discloses another two-component photo curable ink composition set comprising an ink composition A that includes at least a color material, a polymerizable compound, and a radical polymerization photoinitiator; and an ink composition B that includes at least a radical polymerizable compound and does not include the color material and the radical polymerization photoinitiator, wherein the ink composition A and/or B includes a sensitizer.

A two-component photo curable ink composition is disadvantageous in that a user has to mix the two parts in a specified ratio and then to use up the mixed two-component photo curable ink composition in a given period of time.

Especially in ink jet printing inks the use of a two-component photo curable ink is impractical. Most ink jet printing inks are delivered to the customer in a closed tank that cannot be opened. Therefore the customer does not have the chance to mix the two components. In case the two components can be mixed, the mixed ink must be stable in terms of not starting polymerisation before the printing process has occurred. This is a quite demanding task as a UV curing process in ink jet printers usually involves high energy irradiated by a lamp. This energy leads to a temperature increase of the inks stored in the respective tanks leading to increased danger of undesired polymerisation.

Another possibility would be to use two separate tanks for each component to be stored. Cumbersome mixing technology would then be needed in the print head to fairly mix the components properly during the printing process.

These disadvantages of the use of a two-component UV ink jet printing ink create a great demand for an improved UV ink jet printing ink.

Another disadvantage associated with the photo curable ink composition of the aforementioned prior art documents is that especially the monofunctional monomers are smelling and vaporize before and during the curing or hardening of the ink compositions. The monofunctional monomeric compounds are frequently toxic and hazardous for a user, such as the staff of a print shop or an office.

There is a demand to use effect pigments in printing inks to be able to produce print images having superior optical properties, e.g. having a metallic or optical variable impression. Effect pigments produce an improved optical appearance with increased particle size. Unfortunately, effect pigments tend to settle in ink jet printing ink compositions due to gravity. If the ink jet printing ink composition is a paint or lacquer, the ink jet printing ink composition can easily be mechanically stirred to disperse the effect pigments. When using effect pigments in a printer cartridge, stirring of the ink would be very cumbersome.

SUMMARY

It is an object of the invention to provide a ready-to-use ink jet printing ink composition, containing effect pigments, which does not require a mixing of various components.

It is furthermore an object of the invention to provide an ink jet printing ink composition containing effect pigments which can be used as printing ink wherein the effect pigments remain dispersed.

It is another object of the invention to provide an ink jet printing ink composition, containing effect pigments, which has a reduced or no hazardous potential.

It is furthermore an object of the invention to provide an ink jet printing ink composition that can be used as a curable printing ink composition comprising effect pigments.

The object of the invention is solved by providing a one-component (1K) UV ink jet printing ink composition comprising effect pigments, wherein said composition comprises a) at least one difunctional (meth)acrylate monomer,
b) at least one photoinitiator,
c) effect pigments having a volume averaged particle size distribution with a $D_{98}$<10 μm,
d) optionally trifunctional and/or polyfunctional (meth)acrylate monomers, and wherein the viscosity of the ink jet printing ink composition is at maximum 30 mPas, measured at 25° C. for 10 minutes with a Brookfield R/S rheometer using a double gap cylinder according to DIN 53453 (German Industrial Standards) at 150 rpm and wherein the total concentration of the at least one difunctional (meth)acrylate monomer of a) and the trifunctional and/or polyfunctional (meth)acrylate monomers of d) is in a range of 75 to 100 wt.-%, based on the total amount of (meth)acrylate monomers.

The object of the invention is also solved by providing a 1K UV-ink jet printing ink composition, wherein the viscosity of the at least one difunctional (meth)acrylate monomer and optional any further (meth)acrylate monomers in the ink jet printing ink composition fulfills the condition of formula (I):

$$\frac{\sum_{i=1}^{n} x_i * \eta_i}{\sum_{i=1}^{n} x_i} \leq 30 \text{ mPas}, \tag{I}$$

wherein n is the total number of different monomers, $x_i$ is the amount of a certain monomer i in weight-%, based on the total weight of the monomer mixture and $\eta_i$ is the viscosity of monomer i at 25° C., wherein said composition comprises a) at least one difunctional (meth)acrylate monomer, b) at least one photoinitiator, c) effect pigments having a volume averaged particle size distribution with a $D_{98}$<10 μm, d) optionally trifunctional and/or polyfunctional (meth)acrylate monomers, and wherein the viscosity of the ink jet printing ink composition is at maximum 30 mPas, measured at 25° C. for 10 minutes with a Brookfield R/S rheometer using a double gap cylinder according to DIN 53453 (German Industrial Standards) at 150 rpm.

The one-component (1K) UV ink jet printing ink composition of the invention is ready-to-use which can be directly used without mixing-in any further components.

Preferred embodiments of the one-component (1K) UV ink jet printing ink composition are specified in the dependent claims.

The inventors have found out that a one-component UV ink jet printing ink composition having only a minor smelling can be provided if the ink jet printing ink composition comprises no or a low level of monofunctional (meth)acrylate monomer.

DETAILED DESCRIPTION

The term "difunctional (meth)acrylate monomer" means according to the present invention that the monomer contains either two species selected from the group consisting of acrylate, methacrylate and mixtures thereof, or one species from the group consisting of acrylate and methacrylate and in addition one vinyl group, which is capable to react in a UV photopolymerization, respectively. The ability of the vinyl group to photopolymerize means that this group does not necessarily to be able to initiate a UV initiated radical polymerisation, but it is able to participate in an already initiated radical polymerisation.

Phrased differently, the term "difunctional" (meth)acrylate as used in the present invention means also monomers containing one vinyl group and one (meth)acryl group.

The term "monofunctional (meth)acrylate monomer" means according to the present invention that the monomer contains either one acrylate group or one methacrylate group. The monomer does not contain any vinyl group, which is capable to photopolymerize.

The term "trifunctional (meth)acrylate monomer" means according to the present invention that the monomer contains n groups selected from the group consisting of acrylate, methacrylate and mixtures thereof and 3-n vinyl groups, which are capable to react in a UV photopolymerization, wherein n is an integer between 1 and 3 and preferably n=3.

Phrased differently, the term "trifunctional" (meth)acrylate as used in the present invention means also monomers containing one or more vinyl groups, wherein, however, the monomer contains at least one acrylate or methacrylate group.

The term "polyfunctional (meth)acrylate monomer" means according to the present invention that the respective monomer contains $m_A$ groups selected from the group consisting of acrylate, methacrylate and mixtures thereof and $m_V$ vinyl groups, which are capable to react in a UV photopolymerization, wherein $m=m_A+m_V$ is an integer between 4 and 10, with the proviso that $m_A$ is an integer between 1 and 10 and $m_v$ is an integer between 0 and 9.

Phrased differently, the term "polyfunctional" as used in the present invention means also monomers containing one or more vinyl groups, wherein, however, the monomer contains at least one acrylate and/or methacrylate groups and the total number of acrylate and/or methacrylate groups or vinyl groups in the monomer is between 4 to 10.

The term "(meth)acrylate monomer" means according to the present invention all acrylate monomers, methacrylate monomers and/or acrylate methacrylate monomers irrespective of the number of acrylate and/or methacrylate groups.

The term "mPas" means "mPa·s"

The term "UV" means "ultra violet" or "ultra violet light".

The term "1K UV ink jet printing ink composition" means a one-component UV ink jet printing ink composition.

The term "2K UV ink jet printing ink composition" means a two-component UV ink jet printing ink composition.

The "wt.-%" means "percent-by-weight".

The terms "platelet-like pigments", "plate-like pigments", "platelet-like effect pigments" and "plate-like effect pigments" are used interchangeably.

The inventors have surprisingly found out that a 1K UV ink jet printing ink composition can be provided which is particularly useful as an IN curable ink jet printing ink which can comprise as reactive monomer mainly difunctional or more than difunctional (meth)acrylate monomers.

According to this invention, it is required that the viscosity of the ink jet printing ink composition is at maximum 30 mPas measured at 25° C. for ten minutes with a Brookfield R/S rheometer using a double gap cylinder according to DIN 53453 (DIN: "Deutsche Industrienorm"; in English "German Industrial Standards") at 150 rpm.

A viscosity of less than 30 mPas is a requirement for using the UV ink jet printing ink composition in an ink jet printer. If the 1K UV ink jet printing ink composition has a viscosity of more than 30 mPas, the printing process can be problematic in view of the high viscosity.

Moreover, as the UV ink jet printing ink composition comprises effect pigments which are platelet-like pigments, it is necessary that these effect pigments can orient themselves in a manner parallel to the surface of the substrate after having been printed so that an appealing optical effect is provided for an observer.

The inventors have found out that a viscosity of the ink jet printing ink composition being at maximum 30 mPas in combination with effect pigments having a volume average particle size distribution with a $D_{98}$<10 μm is a superior combination which allows to dose the 1K UV ink jet printing ink composition without any problems and to allow the effect pigments to orient themselves after the ink jet printing ink composition has been printed.

Furthermore, the inventors have found out that effect pigments having a volume average particle size distribution with a $D_{98}$<10 μm do not significantly settle due to its reduced size. This was particularly astonishing with respect to metal effect pigments having a larger density and a larger respective weight per pigment, compared to organic pigments. It turned out that, although the size of the effect pigments is reduced, the optical appearance produced in the print layout is nevertheless superior. Moreover, the reduced particle size of the effect pigments allows surprisingly to use this ink jet printing ink composition as printing ink as the nozzles or tubes or any other part of the printer are not clogged.

(Meth)acrylate Monomers:

Monofunctional (meth)acrylate monomer(s) have a significantly lower viscosity than difunctional or polyfunctional (meth)acrylate monomer(s). Therefore, monofunctional (meth)acrylate monomers are used in the art as monomers to build up the polymer of the cured coating. A low viscosity allows to easily use and dose the composition as UV curable printing ink in a printer.

The inventors have surprisingly found out that difunctional (meth)acrylate monomer(s) can be used for the purpose of this invention if the total viscosity of the ink jet printing ink composition is at maximum 30 mPas. A viscosity of 30 mPas or less allows the effect pigments to orient themselves after the ink jet printing ink composition of the present invention has been printed and before it has been cured.

According to a preferred embodiment of the invention, the viscosity of the ink jet printing ink composition is in a range of between 1 mPas and 26 mPas, further preferred between 4 mPas and 22 mPas. It is also preferred that the viscosity of the ink jet printing ink composition is in a range of between 7 mPas and 18 mPas or 10 to 15 mPas.

According to a preferred embodiment of the invention the ink jet printing ink composition does not contain any vaporizable solvent, preferably no solvent. However, a minor amount of solvent is acceptable. The amount of solvent in the ink jet printing ink composition is in a range of between 0 to 20 wt.-%, such as 3 to 14 wt.-% or 5 to 9 wt.-%. If the ink jet printing ink composition of the invention contains solvent it is preferably a low-volatile or non-volatile solvent. A low-volatile solvent has a volatility which is defined as an evaporation rate larger than 50, compared to Diethyl Ether. Volatile solvents, though possibly technically advantageous, are not accepted in the particular market due to the inherent risk of explosions caused by solvent vapours that could get into contact with hot parts of the UV drying lamp.

Another advantage associated with the use of difunctional (meth)acrylate monomer(s) is that due to two acrylate and/or methacrylate groups or one (meth)acrylate group in combination with a reactive vinyl group per monomer, the obtained coating is cured more rapidly. The reactivity of the (meth) acrylate monomer(s) increases with the number of acrylate and/or methacrylate groups per monomer. Therefore, a difunctional (meth)acrylate monomer is significantly more reactive than a monofunctional (meth)acrylate monomer. The reactivity of the ink jet printing ink composition of the present invention can be increased further if trifunctional and/or polyfunctional (meth)acrylate(s) are added to the ink jet printing ink composition of the present invention.

The increased reaction rate of the polymerization is a significant improvement if the ink jet printing ink composition is used as a printing ink. Due to the increased reaction rate the process of printing can be further accelerated, i.e., an increased number of printed and cured products can be produced per time unit.

The degree of cross-linking in the obtained coating is also increased by using difunctional (meth)acrylate(s) as the monomers can be cross-linked via the two acrylate and/or methacrylate groups per monomer, or the vinyl group, if present. The degree of cross-linking can be further increased by adding trifunctional or polyfunctional (meth)acrylate monomer(s) having, for example, four to six acrylate or methacrylate groups per monomer to the ink jet printing ink composition of the present invention. The degree of cross-linking is also enhanced by any vinyl group, if present.

The additional use of trifunctional and/or polyfunctional (meth)acrylate(s) monomers, depends on the application. If trifunctional and/or polyfunctional (meth)acrylate monomer(s) are added, the surface of the obtained coating is harder, leading to an improved scratch-resistance. However, simultaneously the flexibility of the obtained coating is reduced.

Therefore, it is preferred to add trifunctional (meth)acrylate monomer(s) and/or polyfunctional (meth)acrylate(s), as defined above, if an increased hardness and/or scratch-resistance is desired.

It turned out that adding trifunctional (meth)acrylate monomer(s) to the ink jet printing ink composition of the present invention is advantageous to obtain a relatively scratch-resistant coating but simultaneously to maintain a certain flexibility of the coating.

It is of course possible to also add monofunctional (meth) acrylate monomer(s) to the ink jet printing ink composition of the invention, with the proviso that monofunctional (meth) acrylate monomer(s) are added in an amount in a range between 0 to 25 weight-%, based on the total amount of (meth)acrylate monomers in the ink jet printing ink composition.

Preferably, the amount of monofunctional (meth)acrylate monomers is up to 20 wt.-%, preferably up to 14 wt.-%, and more preferably up to an 9 wt.-%, each based on the total amount of (meth)acrylate monomers in the ink jet printing ink composition.

According to another embodiment, the amount of monofunctional (meth)acrylate monomer(s) is in range of between 1 to 8 wt.-% or between 2 to 5 wt.-%, based each on the total amount of (meth)acrylate monomers in the ink jet printing ink composition.

According to another preferred embodiment, the amount of monofunctional (meth)acrylate monomer(s) is in range of between 0 to 5 wt.-% or between 0 to 3 wt.-%, based each on the total amount of (meth)acrylate monomers in the ink jet printing ink composition.

According to a preferred embodiment of the invention, the ink jet printing ink composition does not contain any monofunctional (meth)acrylate monomer(s). Preferably, the ink jet printing ink composition of the invention contains in terms of (meth)acrylate monomers only difunctional and trifunctional (meth)acrylate monomer(s).

According to another embodiment of the present invention, the weight ratio of said at least one difunctional (meth)acrylate monomer to said at least one trifunctional (meth)acrylate monomer is in a range of between 2:1 to 12:1 (w/w). According to another preferred embodiment, the weight ratio is in a range of 2.5:1 to 10:1 (w/w).

Generally acrylate monomers are preferred compared to methacrylate monomers, irrespective of their functionality.

According to another embodiment of the invention, the viscosity of the at least one difunctional (meth)acrylate monomer and optional any further (meth)acrylate monomer(s) in the ink jet printing ink composition fulfils the condition of formula (I)

$$\frac{\sum_{i=1}^{n} x_i * \eta_i}{\sum_{i=1}^{n} x_i} \leq 30 \text{ mPas}, \tag{I}$$

preferably ≤26 mPas, further preferably ≤22 mPas, more preferably ≤18 mPas, more preferably ≤15 mPas, wherein n is the total number of different monomers, $x_i$ is the amount of a certain monomer i in wt.-%, based on the total weight of the monomer mixture and is the viscosity of the monomer i at 25° C.

Formula (I) describes the viscosity of the mixture of at least one difunctional (meth)acrylate as well as any other optionally present (meth)acrylate, which may be a trifunctional, polyfunctional and/or monofunctional (meth)acrylate.

According to another embodiment of the invention, the surface tension of said at least one difunctional (meth)acrylic monomer and optional any further (meth)acrylate monomer(s) is higher than 19 mN/m, more preferably higher than 24 mN/m, further preferred higher than 30 mN/m. Such difunctional (meth)acrylic monomers surprisingly enable an improved leafing effect of the effect pigment.

The surface tension can be measured according to ISO 6889 with Wilhelmy's plate method using a Kruess Tensiometer K100.

Furthermore, it is preferred that said at least one difunctional (meth)acrylic monomer and optional any further (meth)acrylate monomer(s) has each a molecular mass of less than 350 g/mol, more preferably less than 290 g/mol.

According to another embodiment of the invention, said at least one difunctional (meth)acrylic monomer has the formula (II)

$$E_z\text{-}B \quad \text{(II)}$$

wherein B is a linear, a branched or a cyclic aliphatic or aromatic residue comprising 1 to 20 C-atoms, which may contain O, S or NH, with z=2, E=acrylate or methacrylate or vinyl, with the proviso that the difunctional (meth)acrylate monomer contain at least one acrylate or methacrylate group.

According to another embodiment of the invention, said at least one tri- or polyfunctional (meth)acrylic monomer has the formula (III)

$$E_y\text{-}B \quad \text{(III)}$$

wherein B is a linear, a branched or a cyclic aliphatic or aromatic residue comprising 1 to 20 C-atoms, which may contain O, S or NH, with y=3 to 10 and E=acrylate or methacrylate or vinyl with the proviso that the tri- or polyfunctional (meth)acrylate monomer contain at least one acrylate or methacrylate group. Preferably y is 3 to 6.

According to another embodiment of the invention B in formula (II) and/or formula (III) is a linear, a branched or a cyclic aliphatic or aromatic residue comprising 1 to 12 C-atoms, preferably 2 to 6 C-atoms, which may contain O, S or NH.

According to the present invention it is necessary that the UV ink jet printing ink composition comprises at least one difunctional (meth)acrylate monomer.

In addition to these difunctional (meth)acrylate monomers, monofunctional (meth)acrylate monomer(s) and/or trifunctional (meth)acrylate monomer(s) and/or polyfunctional (meth)acrylate monomer(s) can be added to the ink jet printing ink composition of the present invention as explained above, so that a mixture of different (meth)acrylate monomers are used.

According to another embodiment of the invention, the amount of difunctional (meth)acrylate monomer(s), based on the total weight of the (meth)acrylate monomer(s), is in a range of between 50 and 100 wt.-%, preferably of between 60 and 95 wt.-%, further preferred of between 65 and 90 wt.-%, further preferred of between 70 and 90 wt.-%, each based on the total weight of all the (meth)acrylate monomer(s).

According to another embodiment of the invention, the amount of trifunctional (meth)acrylate monomer(s), based on the total weight of the (meth)acrylate monomer(s), is in a range of between 5 and 40 wt.-%, preferably of between 10 and 35 wt.-%, further preferred of between 10 and 30 wt.-%, each based on the total weight of all the (meth)acrylate monomer(s).

According to another embodiment of the invention, the amount of polyfunctional acrylate monomer, based on the total weight of the (meth)acrylate monomers, is in a range of between 0 and 30 wt.-%, preferably of between 0 and 20 wt.-%, further preferred of between 2 and 15 wt.-%, each based on the total weight of all the (meth)acrylate monomers.

Pursuant to another embodiment of the invention, the viscosity of the ink jet printing ink composition, measured at 25° C. for ten minutes with a Brookfield R/S rheometer using a double gap cylinder according to DIN 53453 at 150 rpm is in a range of between 1 to 30 mPas, preferably of between 4 to 24 mPas, more preferably between 8 to 20 mPas.

The viscosity of the (meth)acrylate monomer(s) is likewise measured at 25° C. for ten minutes with a Brookfield R/S rheometer using a double gap cylinder according to DIN 53453 at 150 rpm.

The viscosity of difunctional (meth)acrylate monomer is preferably in a range of 1 mPas to 15 mPas, more preferably between 2 mPas to 12 mPas, further preferably between 4 mPas and 10 mPas.

The viscosity of the trifunctional (meth)acrylate monomer is in a range of between 30 mPas to 100 mPas, further preferred 30 mPas to 70 mPas.

The viscosity of the polyfunctional (meth)acrylate monomer is preferably in a range of between 100 mPas to 500 mPas, preferably between 100 mPas to 200 mPas.

According to a preferred embodiment of the invention, the difunctional (meth)acrylate monomer(s) is selected from the group consisting of ethylene glycol dimethacrylate, diethylene glycol dimethacrylate, dipropylene glycol diacrylate, tripropylene glycol diacrylate, 1,9-nonanediol diacrylate, tetraethylene glycol dimethacrylate, 1,6-hexanediol dimethacrylate, neopentyl glycol dimethacrylate, propoxylated neopentyl glycol diacrylate, 2-hydroxy-1,3-dimethacryloxypropane, 1,4-butanediol dimethacrylate, 1,6-hexandiol diacrylate, 1,10-decandiol diacrylate, 2-(2-vinyloxyethoxy)ethyl acrylate and mixtures thereof.

More preferred monomers of this group are 1,6-hexanediol diacrylate, 2-(2-vinyloxyethoxy)ethyl acrylate and propoxylated neopentyl glycol diacrylate and mixtures thereof.

The trifunctional (meth)acrylate monomer(s) is preferably selected from the group consisting of trimethylolpropane trimethacrylate, trimethylolpropane triacrylate, pentaerythritol triacrylate, propoxylated glycerol triacrylate, ethoxylated trimethylolpropane triacrylate and mixtures thereof.

More preferred monomers of this group are trimethylolpropane triacrylate and ethoxylated trimethylolpropane triacrylate and mixtures thereof.

The polyfunctional (meth)acrylate monomer(s) is preferably selected from the group consisting of di-trimethylolpropane tetraacrylate, ethoxylated pentaerythritol tetraacrylate, di-pentaerythritol pentaacrylate and mixtures thereof.

The monofunctional (meth)acrylate monomer(s), if present in the 1K UV ink jet printing ink composition, are preferably selected from the group consisting of (2-methyl-2-ethyl-1,3-dioxolan-4-yl)methyl acrylate, (2-methyl-2-isobutyl-1,3-dioxolan-4-yl)methyl acrylate, phenoxyethyl acrylate, isobornyl acrylate, methoxydiethylene glycol monoacrylate, acryloyl morpholine, lauryl acrylate, isodecyl acrylate, octyl acrylate, decyl acrylate, phenoxyethyl acrylate, oxyethylated phenol acrylate, tetrahydrofurfuryl acrylate, 2-(2-ethoxy-ethoxy)ethyl acrylate, 4-t-butylcyclohexyl acrylate and mixtures thereof.

More preferred monomers of this group are tetrahydrofurfuryl acrylate and phenoxyethyl acrylate and mixtures thereof.

According to another embodiment of the invention, the effect pigments are platelet-like metal effect pigments.

The inventors were surprised that metal effect pigments can be used in the 1K UV ink jet printing ink composition of the present invention. The ink jet printing ink composition is cured by irradiation with UV light. However, metal effect pigments, especially aluminium effect pigments, are mirror-like and have a high reflectivity and, consequently, reflect the incident UV light. It turned out that irrespective of the partial reflection of the UV-light, the ink jet printing ink composition is reliably cured. Although not wishing to be bound by theory, it is assumed that the "disadvantage" of having metal effect pigments contained in the ink jet printing ink composition, which would be expected to lead to an impaired curing upon UV radiation, is compensated by using difunctional (meth) acrylate monomers having an increased chemical reactivity, compared to monofunctional (meth)acrylate monomers used in the art.

Effect Pigments:

Effect pigments are platelet-like or plate-like pigments such as platelet-like metal effect pigments or interference pigments, e.g. pearlescent pigments. Especially preferred are platelet-like metal effect pigments.

Effect pigments are characterised by a platelet like structure that allows to reflect incident light and/or to refract incident light. Metal effect pigments act like tiny mirrors that reflect the incident light at the metallic platelet-like surface. Pearlescent pigments are at least partially transparent so that a part of the incident light is reflected at the surface of the pigment or at a layer building up the structure of pearlescent pigment and another part of the incident light is refracted at the layered structure and transmitted through the pigment. As a result interference occurs so that the pearlescent pigments show a change of color depending on the viewing angle.

In order to obtain an appealing optical effect, the plate-like pigments have to orient themselves in the applied ink jet printing ink composition, e.g. a lacquer, paint, printing ink, etc., in a parallel manner to the surface of the substrate. In that case, incident light is reflected and/or refracted in a co-ordinated manner by the various plate-like pigments as explained before. If the plate-like pigments are not oriented, i.e. the surface of the effect pigments are statistically oriented, the incident light is scattered in all directions which is an unpleasant view for an observer.

The platelet-like metal effect pigments can be obtained by mechanical shaping of metallic particles, for example by milling the metallic particles in a ball mill or attrition mill. The metallic particles to be milled can be obtained by atomizing molten metal in a conventional manner. Alternatively, it is also possible to use metal foils that are further comminuted.

Alternatively, it is also possible to use platelet-like metal effect pigments which are obtained by physical vapour deposition of vaporized metals on a planar substrate coated with a release coating. The deposited metal sheet or foil is released from the planar substrate and subsequently comminuted. These pigments are commonly designated as PVD-pigments.

The metal effect pigments are preferably made of a metal selected from the group consisting of aluminium, iron, copper, chromium, zinc, tin, brass, bronze, lead, silver, gold, metal alloys thereof and mixtures thereof. Aluminium effect pigments, copper effect pigments and bronze effect pigments are particularly preferred. According to an utmost preferred embodiment the metal effect pigments are aluminium effect pigments.

The platelet-like metal effect pigments are obtained either by mechanical shaping such as ball milling or by physical vapour deposition. Thereafter they have to be comminuted in an additional step to obtain the desired small sizes. This is in detail described in US 20100279083 A1, which is incorporated herein by reference.

Pearlescent pigments of desired small sizes can be obtained according to WO 2011/000491 A2, which is incorporated herein by reference.

The metal effect pigments need to be treated with corrosion inhibitors or barrier coatings which adhere to the surface of the metal effect pigments and protect the metal effect pigments against oxidation and/or corrosion.

Encapsulation of metal effect pigments is especially necessary to prevent catalysis of the polymerisation reaction by the surface of the metal pigments. The metal effect pigment surface may be catalytically active to enhance the UV-induced polymerisation of the monomers and thus they can strongly decrease the shelf live of the pigmented ink jet printing inks compared to inks pigmented with conventional pigments.

In preferred embodiments the metal effect pigments are coated with corrosion inhibiting additives. Most preferred examples of these additives are phosphorous containing additives such as phosphoric acid derivatives, phosphonic acid derivatives or phosphinic acid derivatives or mixtures thereof.

Such additives are form a chemical bond with the surface of the metal pigment, but usually do not crosslink with their organic residues.

In other preferred embodiments the metal effect pigments are encapsulated with a three dimensionally crosslinked coating, such as, for example, an organic polymer coating or a metal oxide or a mixture thereof.

Such coatings act as barrier coating to prevent the above-mentioned undesired drawbacks.

The three dimensionally crosslinked coating can also be combined with an additive treatment to stabilize the surface of the metal effect pigment.

Such an encapsulating three dimensional crosslinked organic polymer coating can be an acrylate and/or methacrylate coating.

According to another embodiment of the invention the metal effect pigment is encapsulated with a protective metal oxide coating, such as silicon oxide, aluminium oxide, boron oxide and/or cerium oxide.

Preferably, the protective inorganic coating is silicon oxide and most preferably silicon dioxide. The silicon oxide, preferably silicon dioxide, can be applied to the pigment surface using water glass. According to a further preferred embodiment the silicon oxide, preferably silicon dioxide, is applied using sol-gel-technology, wherein preferably silicon tetra alkoxide, with alkoxy being preferably methoxy, ethoxy, propoxy or butoxy, is hydrolysed and silicon oxide, silicon hydroxide and/or silicon oxide hydrate is deposited on the pigment surface.

It is also possible to apply a coating of high refractive metal oxide, such as iron oxide, titanium oxide, tin oxide, chromium oxide, zinc oxide, or mixtures thereof.

Preferably, a low refractive coating of silicon oxide and/or aluminium oxide is applied first. According to another embodiment of this invention, a high refractive metal oxide coating, preferably iron oxide and/or titanium oxide, is applied on a first silicon oxide coating.

According to another embodiment of the invention, the high refractive metal oxide, such as iron oxide and/or titanium oxide, is furthermore coated by a cerium oxide coating and, preferably, additionally by an outermost silicon oxide coating which may be organic-chemically modified. Alternatively, the silicon oxide coating, which may be organic-chemically modified, may be directly applied to the surface of the high refractive metal oxide, such as iron oxide and/or titanium oxide, i.e. without applying a cerium oxide coating.

According to another embodiment of the invention the metal effect pigments are coated in alternately manner with layers of high and low or low and high refractive metal oxide.

A metal oxide having a refractive index of less than 1.8, preferably in a range of 1.5 to 1.6, is a low refractive metal oxide according to this invention. A metal oxide having a refractive index of more than 1.8, preferably in a range of between 2.0 to 2.7, is a high refractive metal oxide according to this invention.

An organic-chemical modification which can be applied on the outermost layer, preferably silicon oxide, in particular silicon dioxide, is preferably a silane coating, wherein the applied silane can be chemically reactive or non-reactive.

According to a preferred embodiment, the silane(s) are chemically reactive. Preferably the silane(s) contain at least one of an acrylate and methacrylate group.

The chemically reactive silanes can be selected from the group consisting of acryloxy methyl dimethyl methoxy silane, acryloxy methyl methyl dimethoxysilane, acryloxy methyltrimethoxysilane, methacryloxymethyl dimethyl methoxysilane, methacryloxymethyl methyl dimethoxysilane, methacryloxy methyl trimethoxysilane, acryloxy methyl dimethyl ethoxysilane, acryloxy methyl methyl diethoxysilane, acryloxy methyl triethoxysilane, methacryloxymethyl dimethylethoxy silane, methacryloxy methyl methyl diethoxysilane, methacryloxy methyl triethoxysilane and mixtures thereof.

It is advantageous to apply silanes containing acrylate and/or methacrylate group(s) on the outer surface of the platelet-like metal effect pigments as these groups can readily react with the acrylate and/or methacrylate groups of the monomers in the 1K UV ink jet printing ink composition of the present invention. As a result, the platelet-like metal effect pigments are covalently bonded and integrated in the polymerized acrylate and/or methacrylate monomers in the cured coating.

It is, of course, also possible to apply a silane containing a chemically reactive organo-functional group, different from acrylate and methacrylate, such as vinyl, epoxy, amino, hydroxyl, etc. According to a preferred embodiment the chemically reactive organofunctional group of the silane is reactive with the (meth)acrylate monomers used in the ink jet printing ink composition of the invention.

In order to improve the leafing-behaviour of the effect pigments it is also preferred to coat the effect pigments with hydrophobic silanes, such as alky silanes having a C8 to C24 alkyl group, preferably a C10 to C18 alkyl group. The importance of the leafing effect is explained below.

According to a preferred embodiment of the invention the effect pigments are coated with a silane having a chemically reactive organo-functional group, such as acrylate or methacrylate, as well as with an alkyl silane having a C8 to C24 alkyl group, preferably a C10 to C18 alkyl group.

The coatings obtained are scratch-resistant, humidity resistant and mechanically stable as the platelet-like metal effect pigments are chemically bonded to and into the polymerized acrylate and/or methacrylate monomers.

Instead of platelet-like metal effect pigments, it is also possible and part of the invention to use interference pigments such as pearlescent pigments.

Pearlescent pigments are transparent platelet-like pigments wherein on a platelet-like transparent substrate, such as natural or synthetic mica, glass platelets, silicon dioxide platelets, and/or aluminium oxide platelets, metal oxides having a high refractive index are applied. The high refractive index metal oxide materials are the same as described above, such as, for example, iron oxide and/or titanium oxide.

It is possible to apply alternating layers of high refractive and low refractive index metal oxides on the low refractive platelet-like substrate. The low refractive metal oxides are the same as specified above with respect to metal effect pigments.

All the explanations given above with respect to platelet-like metal effect pigments are to be applied respectively to pearlescent pigments.

According to the present invention, the effect pigment, which can be platelet-like metal pigments and/or pearlescent pigments, have a volume average particle size distribution with a $D_{98}$<10 μm.

A $D_{98}$<10 μm means that 98% of all of the particles are below the stated value, i.e. below 10 μm in the present case. Expressed alternatively, 2% of all the particles are above the stated value.

According to another embodiment of the invention, the effect pigments have a $D_{98}$<8 μm, which means that 98% of all of the particles have a diameter that is less than 8 μm.

According to a preferred embodiment, the effect pigments have a $D_{90}$<8 μm. This means that 90% of all of the particles have a particle size that is below 8 μm, and 10% have a particle size that is above 8 μm. According o the present invention, simultaneously 98% of all particles have a size that is below 10 μm.

According to another preferred embodiment of the invention, the effect pigments have a $D_{10}$-value of at least 0.3 μm, preferably of at least 0.8 μm. Expressed differently, 10% of all pigments have a particle size which is less than 1 μm or less than 2 μm, respectively.

According to another preferred embodiment, the effect pigments have a $D_{50}$-value in a range of 1 to 4 μm and more preferred of 1.5 to 3 μm.

The particle size, i.e. the diameter of the effect pigments can be determined by means of laser granulometry using a CILAS 1064 device.

The effect pigments used in the ink jet printing ink composition of the present invention preferably have an aspect ratio, which is the ratio of the diameter of the plate-like effect pigment to the thickness of the plate-like effect pigment, in a range of 500:1 to 10:1, for example of 250:1 to 50:1. A suitable aspect ratio is in a range of 150:1 to 70:1.

According to another preferred embodiment of the invention, the effect pigments, which can be platelet-like metal pigments and/or pearlescent pigments, are leafing pigments.

"Leafing," means that the pigments are arranged at the surface or nearby the surface of an applied coating film, such as a lacquer film, paint film or ink film. Coatings comprising leafing pigments do have a particular brilliant optical appearance as the pigments are arranged at the surface or nearby the surface of the coating.

The leafing behaviour of the effect pigments used in the ink jet printing ink composition of the present invention antagonizes the tendency of the effect pigments, especially of metal effect pigments, to settle due to gravity. Therefore, the leafing effect do not only produce a superior optical effect, but also optimizes the ink jet printing ink composition, especially of a printing ink, to avoid settling of the effect pigments, especially of metal effect pigments.

The property whether or not an effect pigment is leafing or non-leafing can be controlled by modification of the pigment surface. If, for example, stearic acid is applied to the pigment surface, a leafing behaviour of the effect pigments is induced. If oleic acid is applied to the pigment surface, non-leafing pigments are obtained. In contrast to leafing pigments that are floating on or nearby the surface of the coating medium, non-leafing pigments arrange themselves within the coating medium.

Besides fatty acids also additives such as organic phosphoric acids and/or phosphonic acids can be used to induce a leafing behaviour. These additives also act as corrosion inhibiting additives.

Metal effect pigments, especially aluminium effect pigments, can act as catalyst in terms of polymerisation of (meth) acrylate monomers, especially on difunctional, trifunctional and/or on polyfunctional (meth)acrylate monomers which already have an increased intrinsic chemical reactivity. In order to avoid a premature polymerisation of the (meth)acrylate monomers it is preferred to have the surface of the effect pigments, in particular metal effect pigments, particularly aluminium effect pigments, coated with additives preventing the polymerisation catalyzing activity of the pigment surface.

Preferably, the organic phosphoric or phosphonic acids are selected from the group consisting of C4-C20 aliphatic, linear or branched phosphoric or phosphonic acids. Preferably the effect pigments are coated with organic phosphoric or phosphonic acids are selected from the group consisting of C4-C20 aliphatic, linear or branched phosphoric or phosphonic acids as described in the WO 2009/083176 A1, which is incorporated herein by reference.

According to these embodiments the phosphorous containing additive comprises at least one phosphinic acid, phosphinic acid ester, phosphonic acid, phosphonic acid ester, phosphoric acid and/or phosphoric acid ester or mixtures thereof.

The phosphoric acid or phosphoric acid ester has the following general formula (IV):

$$(O)P(OR^1)(OR^2)(OR^3) \quad \text{(IV)},$$

and the phosphonic acid or phosphonic acid ester has the following general formula (V):

$$(O)PR^4(OR^1)(OR^2) \quad \text{(V)},$$

and the phosphinic acid or phosphinic acid ester has the following general formula (VI):

$$(O)PR^4R^5(OR^1) \quad \text{(VI)},$$

wherein $R^1$, $R^2$, and $R^3$ are independently from each other H or an organic residue with 4 to 30 C, containing optionally heteroatoms such as O, S, and/or N and $R^4$ and $R^5$ are independently an organic residue with 4 to 30 C, containing optionally heteroatoms such as O, S, and/or N.

All the organic residues $R^1$, $R^2$, $R^3$, $R^4$ or $R^5$ can be independently from each other branched or straight alkyl, aryl, alkylaryl or aryl alkyl.

Preferably, the organic residues are straight or branched alkyl having 4 to 24 C, preferably 6 to 18 C, containing optionally heteroatoms such as O, S, and/or N.

Particularly useful are alkyl phosphonic acids having, preferably, an alkyl residue with 6 to 24 C, further preferred 6 to 18 C.

If $R^1$, $R^2$, and $R^3$ are H, then formula (IV) stands for phosphoric acid, formula (V) stands for phosphonic acid and formula (VI) stands for phosphinic acid, respectively.

According to a preferred embodiment of the invention the phosphorous containing additive has an acid number in a range of 50 to 150 mg KOH/g phosphorous containing additive. Further preferred the acid number is in a range of 70 to 120 mg KOH/g phosphorous containing additive.

According to another embodiment of the invention, the phosphorous containing additive has an amine number in a range of 65 to 120 mgKOH/g phosphorous containing additive. Further preferred the amine number is in a range of 80 to 100 mg KOH/g phosphorous containing additive.

According to a preferred embodiment of the invention the phosphorous containing additive has an acid number in a range of 50 to 150 mg KOH/g and an amine number in a range of 65 to 100 mg KOH/g. Further preferred the acid number is in a range of 70 to 120 mg KOH/g and the amine number is in a range of 80 to 100 mg KOH/g.

Besides inducing a leafing behaviour of the effect pigments these additives also serve as protecting coatings on the surface of the effect pigments to prevent the catalytic induction of undesired polymerisation processes caused especially by metal effect pigments.

According to another preferred embodiment of the invention the leafing inducing additives are selected from the group consisting of saturated fatty acids such as myristic acid, palmitinic acid, stearylic acid, arachinic acid, behenic acid, cerotine acid and mixtures thereof.

These fatty acids and/or organic phosphonic acids and/or phosphoric acid esters can also be used as lubricants when metallic particles are mechanically flattened, for example by milling in a ball mill. The addition of lubricants avoids cold-welding of the particles during the mechanical flattening. Preferably, about 1% to 20% by weight, more preferably 2% to 10% by weight and very preferably 3% to 5% by weight of lubricant, based on the weight of the metal, is used during the mechanical flattening, such as milling in a ball mill.

Particularly preferred embodiments of the invention are 1K UV-curable ink jet printing inks comprising:

a) at least one difunctional (meth)acrylate monomer, b) at least one photoinitiator, c) metal effect pigments prepared by PVD-process and having a volume averaged particle size distribution with a $D_{98}<10$ μm and being coated al least partially with $SiO_2$ or a phosphorous containing additive from the group consisting of phosphoric acid or phosphoric acid ester have the following general formula (IV):

$$(O)P(OR^1)(OR^2)(OR^3) \quad \text{(IV)},$$

or a phosphonic acid or phosphonic acid ester have the following general formula (V):

$$(O)PR^4(OR^1)(OR^2) \quad \text{(V)},$$

or a phosphinic acid or phosphinic acid ester have the following general formula (VI):

$$(O)PR^4R^5(OR^1) \quad \text{(VI)},$$

wherein $R^1$, $R^2$, and $R^3$ are independently from each other H or an organic residue with 4 to 30 C, containing optionally heteroatoms such as O, S, and/or N and $R^4$ and $R^5$ are independently an organic residue with 4 to 30 C, containing optionally heteroatoms such as O, S, and/or N d) optionally trifunctional and/or polyfunctional (meth)acrylate monomers.

The viscosity of the ink jet printing ink composition is at maximum 25 mPas, measured at 25° C. for 10 minutes with a Brookfield R/S rheometer using a double gap cylinder according to DIN 53453 (German Industrial Standards) at 150 rpm and wherein the total concentration of the at least one difunctional (meth)acrylate monomer of a) and the trifunctional and/or polyfunctional (meth)acrylate monomers of d) is in a range of 75 to 100 wt.-%, based on the total amount of (meth)acrylate monomers.

Most preferably this ink jet printing ink contains no or only minor amounts (up to 3% by weight, based on the total amount of all (meth)acrylate monomers.

Photoinitiators:

It is possible to use a wide variety of photoinitiators. There is no particular limitation in this respect.

For example, benzyl dimethyl ketal, alpha-hydroxyalkylphenone, alpha-aminoalkylphenone, acylphosphine oxide, oxime ester, thioxanthone, alpha-dicarbonyl, anthraquinone, or photoinitators commercially available, for example those sold under the trademarks Irgacure® and Darocur®, obtainable by BASF, Germany, can be used.

Pursuant to another embodiment of the invention, the at least one photoinitiator comprises a benzophenone-derivative.

Preferably, the benzophenone-derivative is selected from the group consisting of dimethylhydroxyacetophenone, benzophenone, 4-methyl benzophenone, 2-methyl-4-(methylthio)-2-morpholinopropiophenone, 2,2-dimethoxy-phenylacetophenone, 1-hydroxycyclohexylphenylketone . . . .

It is particularly preferred to use a mixture of photoinitiators. A particularly preferred mixture comprises ethyl-2,4,6-trimethylbenzoylphenyl phosphinoxide, dimethylhydroxyacetophenone and: phenyl-bis-2,4,6-trimethylbenzoyl phosphinoxide.

Further Components:

According to another aspect of the invention, the ink jet printing ink composition further contains additives, such as anti-settling additives, defoamers, preservatives, light-stability agents, cross-linking agents, flow improvers, slip additives, viscosity-reducing agents, pH-modifiers etc.

It is particularly preferred to add additives, in particular anti-settling additives and/or leafing additives, to the ink jet printing ink composition, which bind to the surface of the effect pigments, in particular metal effect pigments, especially in case of aluminium effect pigments.

In accordance with another embodiment of the invention, the ink jet printing ink composition does not contain a defoamer based on silicone. Furthermore, it is preferred that the ink jet printing ink composition does not contain surfactants based on silicone.

Additives on the basis of silicone tend to reduce the leaving behaviour of the effect pigments which then leads to an increased tendency of the effect pigments, especially of metal effect pigments, to settle in the ink jet printing ink composition, in particular in a printing ink. Therefore, it is preferred to avoid the addition of silicone-based additives to the ink jet printing ink composition of the present invention.

It is generally preferred that the ink jet printing ink composition of the invention does not contain surfactants or only minor amounts of surfactants so that the leafing behaviour of the effect pigments is not impaired. The amount of surfactant is preferably in a range of between 0 wt.-% to 2.0 wt-% and more preferably between 0.1 and 1.0 wt.-%, based on the total weight of the ink jet printing ink composition.

Ink Jet Recording System:

The invention further is directed to an ink jet recording method comprising the use of an inventive ink jet printing ink disclosed in this invention in an ink jet printer.

A preferred embodiment of the ink jet recording method according to the invention comprises a recording medium and an ink jet recording apparatus, wherein the above mentioned 1K UV-ink jet printing ink composition is ejected from the ink jet printer to adhere to a recording medium forming a printed surface on the recording medium, and then the printed surface is irradiated with ultraviolet rays as light.

In the ink jet recording method according to preferred embodiments, the photocurable ink composition for ink jet recording is ejected on a recording medium with an ink jet recording apparatus. The ink jet recording apparatus used in the embodiment is not particularly limited as long as it can eject ink droplets so that the droplets adhere to a recording medium for recording information.

The recording system of the ink jet recording apparatus is, for example, a system in which a strong electric field is applied between a nozzle and an acceleration electrode disposed ahead of the nozzle to sequentially eject ink droplets from the nozzle and a printing information signal is applied to a deflection electrode, for recording, while the ink droplets are travelling between the deflection electrodes; a system (electrostatic attraction system) in which ink droplets are ejected according to printing information signals without deflecting the ink droplets; a system in which an ink solution is applied with a pressure by a small-sized pump and a nozzle is mechanically vibrated using a quartz oscillator or the like to forcedly eject the ink droplets; a system (piezoelectric system) in which a piezoelectric element simultaneously applies a pressure and a printing information signal to an ink solution to eject ink droplets for recording; or a system (thermal jet system) in which an ink solution is heated with a microelectrode according to a printing information signal to form foam for ejecting ink droplets for recording.

The ink jet recording apparatus includes an ink jet recording head, a body, a tray, a head-driving mechanism, a carriage, an ultraviolet irradiation unit mounted on a side face of the carriage, and so on.

In a particularly preferred embodiment the ink jet recording apparatus includes at least four ink channels for cyan, magenta, yellow, and black and optionally further channels for white and/or light colored magenta and/or spot colors and is configured so as to be capable of full color printing. At least one of these ink channels is filled with the 1K UV ink jet printing ink composition for ink jet recording according to this invention. In addition, the ink jet recording apparatus is provided with, for example, an exclusive control board in the inside thereof for controlling the ink ejection timing of the ink jet recording head and scanning of the head-driving mechanism.

The ultraviolet irradiation can be conducted by the ultraviolet irradiation unit mounted on the side face of the carriage in the ink jet recording apparatus. The wavelength of the irradiation light is not particularly limited, but is preferably from 350 nm to 450 nm. The light dose is preferably in a range of from 10 mJ/cm$^2$ to 20.000 mJ/cm$^2$ and more preferably from 50 mJ/cm$^2$ to 15.000 mJ/cm$^2$. Ultraviolet light in this dose range can sufficiently cure the printed surface of the photocurable ink composition for ink jet recording formed on a recording medium.

In addition, ultraviolet irradiation may be performed by inducing light to the printed surface with a light guide from a metal halide lamp, a xenon lamp, a carbon arc lamp, a chemical lamp, a low-pressure mercury lamp, a high-pressure mercury lamp, or the like. The light source, for example, a commercially available lamp such as H lamp, D lamp, or V lamp available from Fusion System can be used. Furthermore, an ultraviolet light-emitting semiconductor element such as an ultraviolet light-emitting diode (ultraviolet LED) or an ultraviolet light-emitting semiconductor laser can be used as a light source for conducting ultraviolet irradiation.

The ultraviolet irradiation may be performed inside the ink jet recording apparatus as in those exemplarily shown above or may be performed using an external ultraviolet irradiation unit after formation of a printed surface with an ink jet recording apparatus that does not have the ultraviolet irradiation unit.

Any recording medium can be used in the ink jet recording method of the embodiment as long as the ink composition can adhere thereon by using an ink jet recording apparatus. Examples of the recording medium include nonabsorptive recording media such as metal, glass, and plastic and absorptive recording media such as paper, film, and cloth. In addition, the recording medium may be, for example, colorless transparent, translucent, colored transparent, chromatic opaque, or achromatic opaque.

The ink jet recording method of the embodiment can be applied to a production of a color filter or a process for manufacturing industrial products, such as marking to a printing substrate.

In the ink jet recording method such as the above described embodiment, since the photocurable ink composition for ink jet recording contains preferably a metallic pigment composed of a plate-like particle, a printed surface having a glossy metallic surface with high glossiness can be formed on a recording medium. Furthermore, since the photocurable ink composition for ink jet recording contains preferably a metallic pigment composed of a plate-like particle, curing reaction of the polymerizable compound in the printed surface can sufficiently proceed.

The invention will now be illustrated by the following examples, which are not to be taken as limiting. The skilled person is aware that modifications to the invention are conceivable without departing the scope of the invention.

EXAMPLES

Pigment 1:

Pigment 1 is a PVD-aluminium pigment (particle size distribution: $D_{10}$: 0.3 μm; $D_{50}$: 1.9 μm; $D_{90}$: 3.5 μm; $D_{98}$: 5.0 μm), It was obtained as described in Example 2 (Pigment B) of WO 2009083176 A1. Parts of the solvent were removed by heating under vacuum until a pigment content of 32% by weight is obtained.

Pigment 2:

Pigment 2 is an aluminium pigment obtained by milling (particle size distribution: $D_{10}$: 1.2 μm; $D_{50}$: 2.5 μm; $D_{90}$: 4.9 μm, $D_{98}$: 7.0 μm). It was obtained according to Example 3 of the US 20100194836 A1, Parts of the solvent was removed by heating under vacuum. A pigment content of 50% by weight was obtained with additional 2-Hydroxy-2-methyl-1-phenyl-1-propanone as solvent.

Pigment 3:

Pigment 3 is a commercially available pearl pigment, Pearl Super Soft silver (particle size distribution: $D_{10}$: 1.8 μm; $D_{50}$: 4.2 μm; $D_{90}$: 7.0 μm, $D_{99}$: 9.8 μm), manufactured by Eckart GmbH, Germany. It was present in the form of a powder.

Varnish 1:

| | |
|---|---|
| Hexanediol diacrylate | 60.9 |
| Trimethylolpropane triacrylate | 21.6 |
| Propoxylated neopentyl diacrylate | 2.5 |
| Ethyl-2,4,6-Trimethylbenzoyl phenylphosphinoxide | 7.6 |
| Phenyl-bis-2,4,6-Trimethylbenzoylphosphinoxide | 4.4 |
| Dimethylhydroxyacetophenone | 3.0 |

Varnish 2:

| | |
|---|---|
| Hexanediol diacrylate | 48.7 |
| Trimethylolpropane triacrylate | 14.3 |
| Propoxylated neopentyl diacrylate | 1.6 |
| Ethyl-2,4,6-Trimethylbenzoyl phenylphosphinoxide | 5.8 |
| Phenyl-bis-2,4,6-Trimethylbenzoylphosphinoxide | 3.3 |
| Dimethylhydroxyacetophenone | 2.5 |
| 2-(2-Vinyloxyethoxy)ethylacrylate | 23.8 |

Varnish 3:

| | |
|---|---|
| Hexanediol diacrylate | 69.2 |
| Trimethylolpropane triacrylate | 20.2 |
| Propoxylated neopentyl diacrylate | 2.3 |
| Ethyl-2,4,6-Trimethylbenzoyl phenylphosphinoxide | 5.3 |
| Phenyl-bis-2,4,6-Trimethylbenzoylphosphinoxide | 3.0 |

Varnish 4:

| | |
|---|---|
| Hexanediol diacrylate | 27.2 |
| Trimethylolpropane triacrylate | 8.7 |
| Propoxylated neopentyl diacrylate | 0.9 |
| Ethyl-2,4,6-Trimethylbenzoyl phenylphosphinoxide | 3.1 |
| Phenyl-bis-2,4,6-Trimethylbenzoylphosphinoxide | 1.8 |
| Dimethylhydroxyacetophenone | 16.7 |
| 2-(2-Vinyloxyethoxy)ethylacrylate | 41.6 |

COMPARATIVE EXAMPLES

Comparative Varnish 5:

| | |
|---|---|
| Varnish 1 | 77 parts by weight |
| Diethylene glycol monobutylether acrylate | 23 parts by weight |

Comparative Varnish 6:

| | |
|---|---|
| Varnish 1 | 77 parts by weight |
| Phenoxyethyl acrylate | 23 parts by weight |

Comparative Varnish 7:

| | |
|---|---|
| Varnish 1 | 77 parts by weight |
| 3-Methoxy-3-methyl-1-butanole | 23 parts by weight |

Process of Preparation Ink Jet Printing Inks:

Pigment or pigment dispersion were dissolved in the varnish by means of a high-speed stirrer. Up to 4% of a polymeric stabilizer could have been be added. Filtration was commonly done through a 15 μm standard depth filter. Ink 4 was filtered through a 5 μm depth filter. Ink 5 was filtered through a 20 μm metal mesh. The ink jet printing inks were composed according to the following parts of varnishes and pigments or pigment dispersions in weight-%:

Ink 1:

| | |
|---|---|
| Varnish 1 | 87.6 parts by weight |
| Pigment 1 | 12.4 parts by weight |

Ink 2:

| | |
|---|---|
| Varnish 2 | 87.6 parts by weight |
| Pigment 1 | 12.4 parts by weight |

Ink 3:

| | |
|---|---|
| Varnish 1 | 89.7 parts by weight |
| Pigment 2 | 10.3 parts by weight |

Ink 4:

| | |
|---|---|
| Varnish 4 | 94.3 parts by weight |
| Pigment 1 | 5.7 parts by weight |

Ink 5:

| | |
|---|---|
| Varnish 3 | 94 parts by weight |
| Pigment 3 | 6 parts by weight |

Comparative Ink 6:

| | |
|---|---|
| Comparative Varnish 6 | 87.6 parts by weight |
| Pigment 1 | 12.4 parts by weight |

Evaluation of Physical Properties:

Viscosity Measurement:

Viscosity was measured at 25° C. for 10 minutes with a Brookfield R/S rheometer using a double gap cylinder according to DIN 53453 (German Industrial Standards) at 150 rpm.

Stability Evaluation:

50 ml of ink are heated to 120° C. on a common lab magnetic stirrer. The ink has to show no gelling for more than 30 minutes at that temperature. Additionally, an ink with metallic pigments should show a leafing mirror on the surface. This mirror has to be stable for 6 months at 40° C. storage.

Reactivity Evaluation:

UV Lamp GEW VPC-XC-30.

A 24 μm drawdown of the ink is cured at 50% lamp energy output and 30 m/min transport speed. The tackiness of the sample is evaluated in a qualitative manner.

Leafing Evaluation:

The leafing effect is observed on the surface of the liquid ink. Strong leafing shows a metallic mirror-like surface on the ink.

TABLE 1

Evaluation of the properties of inks and varnishes

| Probe | Viscosity | Stability | Reactivity | Gloss | Leafing |
|---|---|---|---|---|---|
| Varnish 1 | 16.7 mPas | passed | cured | | |
| Varnish 2 | 9.9 mPas | passed | cured | | |
| Varnish 3 | 15.8 mPas | passed | cured | | |
| Varnish 4 | 7.3 mPas | passed | cured | | |
| Comparative Varnish 5 | 18.1 mPas | passed | tacky | | |
| Comparative Varnish 6 | 14.5 mPas | passed | tacky | | |
| Comparative Varnish 7 | 6.5 mPas | passed | Not cured | | |

TABLE 1-continued

Evaluation of the properties of inks and varnishes

| Probe | Viscosity | Stability | Reactivity | Gloss | Leafing |
|---|---|---|---|---|---|
| Ink 1 | 25.5 mPas | passed | cured | 223 | strong, |
| Ink 2 | 16.2 mPas | passed | cured | 136 | strong |
| Ink 3 | 23.1 mPas | passed | cured | 99 | weak |
| Ink 4 | 7.6 mPas | passed | cured | 385 | strong |
| Ink 5 | 13.2 mPas | passed | cured | | |
| Comparative Ink 6 | 14.2 mPas | passed | tacky | | unstable |

The lack of reactivity of varnishes 5 and 6 and ink 6 can be assigned to the content of low-reactive monomers. Varnish 7 does not cure due to its content of non-reactive low volatile solvent.

In ink 6, the leafing mirror disappears after some days of storage. This is clearly due to the influence of the large amount of the monofunctional monomer, which is 21.3 wt.-% based on the total amount of all acrylate monomers.

All inks show the desired viscosity below 30 mPas. After proper filtration, the use in ink jet machines is possible, mostly without the necessity of modifications. Strong and stable leafing effects are desired for the printing of good gloss levels.

Print Tests:

Print tests were done on a test rig Apollo2, made by Spectra-Dimatix, equipped with a Spectra Nova 256AAA head, a 5-colour UV label printer Picocolour 70 made by JF Machines, equipped with Xaar 1001 heads, and, for Ink 4, on a Mimaki JV3-160S large format printer. The curing lamp is a standard mercury arc lamp with an output of 70 W/cm Typical printing parameters for inks from combinations of the abovementioned varnishes and pigments:

Apollo2:
Temperature: 50° C.
Head voltage: 100V
Waveform: 10/5/5 μs
Firing rate: 5 KHz
Resolution: 300 dpi
Substrate: Herma extracoat 242 label paper
Testfile: Nozzle Pattern (all nozzles)
Run Time: 10 minutes Reliable printing of Ink 1 and Ink 3 without nozzle failures was achieved under the abovementioned conditions.

Pico Colour 70:
Temperature: 50° C.
Pump speed: 20 rpm
Ink bottle position: 5 inches
$V_{offset}$: +4V
Waveform: D822
Resolution: 300 dpi 8 level grayscale
Substrate: Herma Super Gloss label paper
Testfile: Xaar 7 to 1 dpd test
Run Time: 10 times one hour
Reliable operation of the equipment was achieved with inks 1, 2, 3, and 5

Mimaki JV3:
Resolution: 720 dpi ND
Mode: 16pass high-speed bidirectional
Substrate: Igepa Masterscreen 80 self adhesive vinyl
Heater setting: 60° C.
Curing: offline
Testfile: 100% self test square, 2 $m^2$
Run Time: 3 test prints per day, 3 days, separated by a weekend.

Reliable operation of the printer was achieved under the above conditions. After a weekend without operation, the machine started without problems. No color density shifts due to settling of pigment were observed.

What is claimed is:

1. A 1K UV-ink jet printing ink composition comprising effect pigments, wherein said composition comprises:

a) at least one monofunctional (meth)acrylate monomer;

b) at least one difunctional (meth)acrylate monomer, c) at least one photoinitiator, d) effect pigments having a volume averaged particle size distribution with a $D_{98}<10$ μm, said effect pigments selected from the group consisting of platelet-like metal effect pigments and interference pigments, e) at least one trifunctional (meth)acrylate monomer present in the UV ink jet printing ink composition in a range of between 5 to 40 wt.-%, based on the total amount of (meth)acrylate monomers, and f) optionally polyfunctional (meth)acrylate monomers, wherein the viscosity of the ink jet printing ink composition is at maximum 30 mPas, measured at 25° C. for 10 minutes with a Brookfield R/S rheometer using a double gap cylinder according to DIN 53453 (German Industrial Standards) at 150 rpm, wherein said at least one monofunctional (meth)acrylate monomer is present in the UV-ink jet printing ink composition in a range of between 0 to 14 wt.-% based on the total amount of methacrylate monomer, wherein said at least one difunctional (meth)acrylate monomer is present in the UV-ink jet printing ink composition in a concentration in a range of between 60 to 95 wt.-%, based on the total amount of (meth)acrylate monomers, and wherein the total concentration of the at least one difunctional (meth)acrylate monomer of b) and the at least one trifunctional monomer of e) and optionally the polyfunctional (meth)acrylate monomers of f) is in a range of 75 to 100 wt.-%, based on the total amount of (meth)acrylate monomers.

2. The 1K UV-ink jet printing ink composition according to claim 1, wherein said ink jet printing ink composition comprises at least one polyfunctional (meth)acrylate monomer in a concentration in a range of between 2 to 30 wt.-%, based on the total amount of (meth)acrylate monomers.

3. The 1K UV-ink jet printing ink composition according to claim 1, wherein the weight ratio of said at least one difunctional (meth)acrylate monomer to said at least one trifunctional (meth)acrylate monomer is in a range of between 2:1 to 12:1 (w/w).

4. The 1K UV-ink jet printing ink composition according to claim 1, wherein the viscosity of the at least one difunctional (meth)acrylate monomer and optional any further (meth) acrylate monomers in the ink jet printing ink composition fulfills the condition of formula (I):

$$\frac{\sum_{i=1}^{n} x_i * \eta_i}{\sum_{i=1}^{n} x_i} \leq 30 \text{ mPas}, \quad \text{(I)}$$

wherein n is the total number of different monomers, $x_i$ is the amount of a certain monomer i in weight-%, based on the total weight of the monomer mixture and is the viscosity of monomer i at 25° C.

5. The 1K UV-ink jet printing ink composition according to claim 1, wherein the surface tension of said at least one difunctional (meth)acrylate monomer and optional any further (meth)acrylate monomer(s) is higher than 19 mN/m.

6. The 1K UV-ink jet printing ink composition according to claim 1, wherein said at least one difunctional (meth)acrylate monomer and optional any further (meth)acrylate monomer(s) has each a molecular mass of less than 350 g/mol.

7. The 1K UV-ink jet printing ink composition according to claim 1, wherein said at least one of difunctional (meth) acrylate monomer has a structure depicted in formula (II):

$$E_z\text{-}B \quad \text{(II)}$$

wherein:

B is a linear, a branched or a cyclic aliphatic or aromatic residue comprising 1 to 20 C-atoms, which may contain O, S or NH, with z=2, and E=acrylate or methacrylate or vinyl with the proviso that the difunctional (meth)acrylate monomer contains at least one acrylate or methacrylate group.

8. The 1K UV-ink jet printing ink composition according to claim 1, wherein said at least one of tri- or polyfunctional (meth)acrylate monomer has a structure depicted in formula (II):

$$E_y\text{-}B \quad \text{(II)}$$

wherein:

B is a linear, a branched or a cyclic aliphatic or aromatic residue comprising 1 to 20 C-atoms, which may contain O, S or NH, with y=3 to 10, and E=acrylate or methacrylate or vinyl with the proviso that the tri- or polyfunctional (meth)acrylate monomer contains at least one acrylate or methacrylate group.

9. The 1K UV-ink jet printing ink composition according to claim 1, wherein the effect pigments are platelet-like metal effect pigments.

10. The 1K UV-ink jet printing ink composition according to claim 9, wherein the metal effect pigments are encapsulated with a three dimensionally crosslinked coating, such as an organic polymer coating or a metal oxide or a mixture thereof.

11. The 1K UV-ink jet printing ink composition according to claim 1, wherein the effect pigments have a $D_{90}<8$ μm.

12. The 1K UV-ink jet printing ink composition according to claim 1, wherein the effect pigments have a $D_{98}<8$ μm.

13. The 1K UV-ink jet printing ink composition according to claim 1, wherein the effect pigments are leafing pigments.

14. The 1K UV-ink jet printing ink composition according to claim 1, wherein the effect pigments are coated with an additive selected from the group consisting of phosphoric acid or phosphoric acid ester having the following general formula (IV):

$$(O)P(OR^1)(OR^2)(OR^3) \quad \text{(IV)},$$

or phosphonic acid or phosphonic acid ester having the following general formula (V):

$$(O)PR^4(OR^1)(OR^2) \quad \text{(V)},$$

or phosphinic acid or phosphinic acid ester having the following general formula (VI):

$$(O)PR^4R^5(OR^1) \quad \text{(VI)},$$

wherein $R^1$, $R^2$, and $R^3$ are independently from each other H or an organic residue with 4 to 30 C-atoms, containing optionally hetero atoms such as O, S, and/or N and $R^4$ and $R^5$ are independently an organic residue with 4 to 30 C, containing optionally hetero atoms such as O, S, and/or N, wherein all the organic residues $R^1$, $R^2$, $R^3$, $R^4$ or $R^5$ can be, independently from each other, branched or straight alkyl, aryl, alkylaryl or aryl alkyl.

15. The 1K UV-ink jet printing ink composition according to claim 1, wherein the ink jet printing ink composition does not contain a defoamer based on silicone.

16. The 1K UV-ink jet printing ink composition according to claim 1, wherein the ink jet printing ink composition does not contain surfactants based on silicone.

17. The 1K UV-ink jet printing ink composition according to claim 1, wherein the at least one photoinitiator comprises a benzophenone-derivative.

18. An ink jet recording method comprising a recording medium and an ink jet recording apparatus, wherein the 1K UV-ink jet printing ink composition according to claim 1 is ejected from the ink jet recording apparatus to adhere to a recording medium forming a printed surface on the recording medium, and then the printed surface is irradiated with ultraviolet rays as light.

19. A recording medium coated with a cured ink according to the ink jet recording method of claim 18.

20. An ink jet recording apparatus comprising at least four ink channels for cyan, magenta, yellow, and black and optionally further channels for white and/or light colored magenta and/or spot colors and which is configured so as to be capable of full color printing, wherein at least one of these ink channels is filled with the 1K UV ink jet printing ink composition according to claim 1 for ink jet recording.

21. A 1K UV-ink jet printing ink composition, wherein the viscosity of the at least one difunctional (meth) acrylate monomer and optional any further (meth)acrylate monomers in the ink jet printing ink composition fulfills the condition of formula (I):

$$\frac{\sum_{i=1}^{n} x_i * \eta_i}{\sum_{i=1}^{n} x_i} \leq 30 \text{ mPas}, \tag{I}$$

wherein n is the total number of different monomers, $x_i$ is the amount of a certain monomer i in weight-%, based on the total weight of the monomer mixture and is the viscosity of monomer i at 25° C., wherein said composition comprises a) at least one difunctional (meth)acrylate monomer, b) at least one photoinitiator, c) effect pigments having a volume averaged particle size distribution with a $D_{98}$<10 μm, d) optionally trifunctional and/or polyfunctional (meth) acrylate monomers, and wherein the viscosity of the ink jet printing ink composition is at maximum 30 mPas, measured at 25° C. for 10 minutes with a Brookfield R/S rheometer using a double gap cylinder according to DIN 53453 (German Industrial Standards) at 150 rpm.

22. The 1K UV-ink jet printing ink composition according to claim 21, wherein said composition further comprises at least one monofunctional (meth)acrylate monomer in a concentration in a range of between 0 to 25 wt.-%, based on the total amount of (meth)acrylate monomers.

23. The 1K UV-ink jet printing ink composition according to claim 21, wherein said ink jet printing ink composition comprises at least one difunctional (meth)acrylate monomer in a concentration in a range of between 50 to 100 wt.-%, based on the total weight of (meth)acrylate monomers.

24. The 1K UV-ink jet printing ink composition according to claim 21, wherein the weight ratio of said at least one difunctional (meth)acrylate monomer to said at least one trifunctional (meth)acrylate monomer is in a range of between 2:1 to 12:1 (w/w).

25. The 1K UV-ink jet printing ink composition according to claim 21, wherein the effect pigments are platelet-like metal effect pigments.

26. The 1K UV-ink jet printing ink composition according to claim 21, wherein the effect pigments have a $D_{90}$<8 μm.

27. The 1K UV-ink jet printing ink composition according to claim 21, wherein the effect pigments have a $D_{98}$<8 μm.

28. The 1K UV-ink jet printing ink composition according to claim 21, wherein the effect pigments are coated with an additive selected from the group consisting of phosphoric acid or phosphoric acid ester having the following general formula (IV):

$$(O)P(OR^1)(OR^2)(OR^3) \tag{IV},$$

or phosphonic acid or phosphonic acid ester having the following general formula (V):

$$(O)PR^4(OR^1)(OR^2) \tag{V},$$

or phosphinic acid or phosphinic acid ester having the following general formula (VI):

$$(O)PR^4R^5(OR^1) \tag{VI},$$

wherein $R^1$, $R^2$, and $R^3$ are independently from each other H or an organic residue with 4 to 30 C-atoms, containing optionally hetero atoms such as O, S, and/or N and $R^4$ and $R^5$ are independently an organic residue with 4 to 30 C, containing optionally hetero atoms such as O, S, and/or N, wherein all the organic residues $R^1$, $R^2$, $R^3$, $R^4$ or $R^5$ can be independently from each other branched or straight alkyl, aryl, alkylaryl or aryl alkyl.

29. The 1K UV-ink jet printing ink composition according to claim 21, wherein the ink jet printing ink composition does not contain a defoamer based on silicone.

30. The 1K UV-ink jet printing ink composition according to claim 21, wherein the ink jet printing ink composition does not contain surfactants based on silicone.

31. The 1K UV-ink jet printing ink composition according to claim 21, wherein the at least one photoinitiator comprises a benzophenone-derivative.

* * * * *